United States Patent

Sakuma

[15] 3,639,216
[45] Feb. 1, 1972

[54] IMPROVING ADHESION OF ELECTROPLATED METAL ON GRAFT COPOLYMERS

[72] Inventor: Toramitsu Sakuma, Osaka-fu, Japan
[73] Assignee: Sumitomo Naugatuck Company, Ltd., Osaka, Japan
[22] Filed: Aug. 14, 1968
[21] Appl. No.: 752,470

[30] Foreign Application Priority Data

Nov. 11, 1967 Japan..................................42/72464

[52] U.S. Cl...................204/30, 117/138.8 UA, 260/876 R, 260/894
[51] Int. Cl.........................................C23b 5/60, C08f 15/00
[58] Field of Search............260/894, 876 R; 117/138.8 UA; 204/38 B, 30

[56] References Cited

UNITED STATES PATENTS

| | | | |
|---|---|---|---|
| 3,352,820 | 11/1967 | Bawn | 260/876 |
| 3,234,302 | 2/1966 | Wacome | 260/894 X |
| 3,267,007 | 8/1966 | Sloan | 204/38 B |
| 3,332,860 | 6/1967 | Diebold et al. | 204/38 B |
| 3,401,213 | 10/1968 | Trementozzi | 117/138.8 UX |
| 3,437,507 | 4/1969 | Jensen | 117/138.8 UX |

Primary Examiner—John H. Mack
Assistant Examiner—R. J. Fay
Attorney—Robert J. Patterson

[57] ABSTRACT

A synthetic thermoplastic composition having excellent plate adhesion (of electroplated metal deposited on an electroless metal coating) is obtained by adding 0.5 to 5.0 parts by weight of a synthetic diene rubber to 100 parts thermoplastic graft copolymer produced by graft copolymerization of vinylic monomers onto a synthetic diene rubber. Typically a latex of the graft copolymer is blended with a latex of the synthetic diene rubber, the blend is coagulated, and the coagulum is dried. The uniform, intimate mixture of the latex blended polymers is formed in any suitable way into a molded body. When this molded plastic body is electroplated by conventional techniques involving forming an electroless coating of copper or nickel followed by electroplating, significantly enhanced plate adhesion is achieved.

5 Claims, No Drawings

IMPROVING ADHESION OF ELECTROPLATED METAL ON GRAFT COPOLYMERS

BACKGROUND OF THE INVENTION

The invention relates to a new synthetic composition of matter manifested either as a moldable plastic material or as a molded plastic article, with or without an electroplated metal deposit on at least a portion of the surface of the molded plastic article, and to methods of making such composition and articles. In particular, the present invention relates to a synthetic thermoplastic which is obtained by addition of a very small amount of a diene rubber which typically is of the same series or type as that used in the thermoplastic resin to a thermoplastic resin produced by graft polymerization of vinylic monomers onto diene rubber.

It has been known that ABS graft copolymer resin (which typically is a thermoplastic resin made by grafting styrene and acrylonitrile onto a rubbery butadiene polymer) is an excellent resin on which to apply chemical plating. As specifically described by Dr. K. Wiebush in "Kunststoffe" 50, 11 (1966) under the title of "Erfahrungen beim Galvanisierene von ABS-Pfropfpolymerisaten" and by Toramitsu Sakuma in the "Journal of The Adhesion Society of Japan," 3, No. 3, 29 (1967) under the title of "Adhesion of Plastic Plating," it is generally considered that the high adhesion exhibited by chemically plated ABS resin is attributable to the diene rubbery polymeric component of the resin. That is, the ABS resin is a copolymer of a conjugated diene rubbery polymer, as a spine, and acrylonitrile and styrene as branches, and its rubber component serves as a source of adhesion, acrylonitrile as a reduction accelerator of nonelectrolytic plating bath and a source of supply of polar radicals, and styrene for formation of skeleton and better flow and processability. Further, the aforecited literature discloses that an ABS graft copolymer whose resin component forming the branch is in a ratio of about 20 percent of the diene rubber forming the spine, displays the highest impact resistance and plate adhesion. Also, when the degree of grafting is made higher and, as a consequence, the ratio of the resin component which forms the branches becomes greater, the characteristics of the resin component come out so overwhelmingly that the impact resistance and plate adhesion of the resulting plated molding are reduced. It is generally known that in the commercial production of ABS graft copolymer resins it is very difficult to terminate graft copolymerization at a stage where the resin component has been grafted only to the extent of 20 parts per 100 parts of the diene rubbery polymer but that in reality it proceeds to 50 to 70 parts. Thus, in order to improve plate adhesion of commercially available ABS resin which contains the resin component in a large proportion, a method of incorporating an inorganic additive, such as titanium dioxide or finely divided glass fiber, to have them perform an anchor effect, has been proposed. Such a method may have an effect of reinforcing the resin, but it has drawbacks in that the flow and processability of the resin are reduced.

The present inventor has discovered that, by addition and mixing of 0.5 to 5.0 parts by weight of a diene rubber instead of using the aforementioned fillers, the plate adhesion of resin can be greatly improved with hardly any deterioration of the properties inherent in the thermoplastic resin.

U.S. Pat. No. 3,297,600 in the names of Blair et al. is concerned with preventing dusting due to fines in the manufacture of a wide variety of resins by coagulating the resin latex in the conventional way and then treating the coagulated resin by adding thereto a dilute rubber latex (typically containing only 2–7 parts of rubber per 100 parts of water) and coagulating the added latex with residual coagulant left in the coagulated resin mass. The purpose appears to be to bond the fine particles of resin into nondusting aggregates with the coagulum from the dilute rubber latex as a matrix. Blair et al. carry out the treatment at a temperature below the second order transition temperature of the resin which indicates that they were dealing with purely resinous materials which have second order transition temperatures well above ambient temperature. Although they refer to "acrylonitrile-butadiene-styrene resins" in a long listing of resins that may be treated by their invention, they do not disclose or teach application of their invention to graft copolymers of styrene and acrylonitrile on rubbery butadiene polymer; the reference could mean a simple terpolymer of the three monomers. They had no thought of making a uniform, intimate blend of a graft copolymer typified by an ABS graft copolymer with a diene rubber such as is achieved by the present invention. Finally Blair et al. had no thought whatever of effecting improvement of plate adhesion of molded plastic articles made from such graft copolymers, which is the principal objective of my invention.

An object of the present invention is to provide a synthetic thermoplastic resin suitable for forming compression moldings and injection moldings which after plating will have a plate adhesion high enough to withstand industrial uses.

Another objective of the present invention is to provide a synthetic thermoplastic resin molding combining high plate adhesion with good workability and excellent mechanical properties.

SUMMARY OF THE INVENTION

The present invention is a synthetic thermoplastic resin composition having an excellent plate adhesion property which is imparted by addition and uniformly and intimately mixing of 0.5 to 5.0 parts by weight of a diene rubber with 100 parts by weight of a graft copolymer obtained by graft polymerization of two or more kinds of vinyl monomers selected from the group of vinyl aromatics, vinyl cyanides, vinyl pyridines and methacrylic esters (lower, i.e., $C_1$ to $C_6$, alkyl) onto a diene rubber, or 100 parts by weight of said graft copolymer and any separately prepared resinous copolymer admixed therewith.

DESCRIPTION OF THE PREFERRED EMBODIMENTS

Examples of the components constituting a synthetic thermoplastic resin or graft copolymer suitable for use in the present invention are as follows: As the diene rubber, polybutadiene, an acrylonitrile-butadiene copolymer and a butadiene-styrene copolymer can be used. As vinyl aromatics, there may be used styrenes such as styrene, alpha-methyl styrene, vinyl toluene and alkoxy styrene. As vinyl cyanides, there may be used acrylonitrile, methacrylonitrile and chloroacrylonitrile. As vinyl pyridines there may be used any of the monovinylpyridines of alkyl substituted monovinylpyridines. The ester group of the methacrylic esters can be methyl, ethyl, n-propyl, isopropyl, n-butyl, isobutyl, amyl, isoamyl, hexyl and isohexyl.

To specifically illustrate the graft copolymers, there are the so-called ABS resins such as a graft polymer obtained by graft polymerization of a mixture of styrene and/or alpha-methyl styrene and acrylonitrile onto polybutadiene or a butadiene-styrene copolymer, and a mixture of such graft polymer and a copolymer of styrene and/or alpha-methyl styrene and acrylonitrile; the so-called ABSM resins such as a graft polymer obtained by graft polymerization of a monomeric mixture of styrene and/or alpha-methyl styrene, acrylonitrile and methyl methacrylate onto polybutadiene or a butadiene-styrene copolymer and a graft polymer obtained by graft polymerization of monomeric mixture of styrene and/or alpha-methyl styrene and acrylonitrile onto a butadiene-methyl methacrylate copolymer (including, of course, those graft polymers having binary or ternary polymers prepared from styrene, acrylonitrile and methyl methacrylate admixed therein); and so-called MBS resin which comprises, as constituents, butadiene, styrene and methyl methacrylate, with or without acrylonitrile constituent as contained in the foregoing ABSM resin. As a diene rubber to be added to and mixed with the graft polymer under the present invention, there are polybutadiene, a butadiene-acrylonitrile copolymer and a butadiene-styrene copolymer. In the cases of acrylonitrile-butadiene and styrene-butadiene copolymers, a highly rubbery copolymer with a butadiene content of more than 75 percent by weight is preferred.

The incorporation of the diene rubber with the graft copolymer, and any added resin, may be done either by latex blending or blending of dry powders, followed by conventional treatment to effect coalescence of the several components into a uniform homogeneous mixture. The commercially available dry rubber may also be kneaded with the resin by mastication using a Banbury mixer or roll mill or the like.

The preferred method involves blending of separately prepared latices of the several components namely the graft copolymer, any additional resinous copolymer, and the diene rubber, followed by treatment to mass the mixture and form it into an intimate, uniform blend which is then shaped into any desired form as by calendering, injection molding, compression molding or the like. The final article is electroplated by the well-known techniques involving deposition of an electroless coating of copper or nickel followed by electroplating in the usual way.

The amount of diene rubber to be added to the graft polymer must be within a range which does not cause substantial change in the physical properties, and should be restricted to a small amount, namely 0.5 to 5.0 parts by weight against 100 parts by weight of the graft copolymer. The addition and mixing of the diene rubber in an amount less than 0.5 part by weight or more than 5.0 part by weight not only does not impart the resulting molding with satisfactory plate adhesion property but also largely degrades the physical properties of the graft copolymer. (cf. example 1). As is clear from the examples set forth hereinafter, the diene rubber to be added to and mixed with the graft copolymer under the present invention serves to improve greatly the plate adhesion property of a thermoplastic composition and, particularly, to impart a plate adhesion property strong enough to withstand severe conditions in industrial use without causing any appreciable changes in the physical properties of the shaped plastic body such as impact strength, tensile strength and flow.

The present invention is illustrated, but in no way limited, by the following examples.

EXAMPLE 1

A thermoplastic resin powder of a composition consisting of 55 parts of a graft copolymer prepared by emulsion graft polymerization of 50 parts of styrene and acrylonitrile (weight proportion, 70/30) on 50 parts of polybutadiene rubber (used in the form of any commercially available polybutadiene rubber latex, e.g., Firestone's "No. 2004" (trade designation) latex) and 45 parts of a separately prepared resinous copolymer of styrene and acrylonitrile (weight proportion, 70/30) (this composition hereinafter being referred to simply as the graft copolymer) was mixed with 2 parts by weight of a fine powder form of calcium stearate, of smaller than 100 mesh (Tyler) as a lubricant. The mixed powder thus obtained was blended in a supermixer (such as a Kawada or a Henschel intensive mixer) for 10 minutes and was then extruded into pellets by an extruder at a stock temperature of 200° C. The pellets were then compression molded into a 2 mm. thick 40 mm. by 40 mm. flat plate at a stock temperature of 170° C. and under a compression pressure which was gradually raised to a final pressure of 100 kilograms per square centimeter, which pressure was maintained for 7 minutes. Also, using a screw-type injection molding machine, whose capacity was 5 oz./shot, the aforementioned pellets were molded into flat plates (2 mm. × 40 mm. × 40 mm.) at a stock temperature of 22° C., a mold temperature of 70° C., an injection pressure (gauge pressure) of 75 kilograms per square centimeter and a cycle time of 50 seconds.

These test specimens were first dipped for 15 minutes in a chromic acid—sulfuric acid mixed solution containing sulfuric acid in an amount of 50 percent by weight, during which time the solution was heated to 60°–70° C. After being washed with water, they were dipped in a dilute hydrochloric acid solution of stannous chloride for about 5 minutes, then in a dilute hydrochloric acid solution of palladium chloride for about 30 seconds, and finally in an alkaline aqueous solution having a copper ion concentration of about 0.3 percent by weight and a pH value of about 13 for about 15 minutes to form a layer of chemical copper thereon with a thickness of about 0.3 micron.

Thereafter, electrolytic plating of copper was carried out using an ordinary acidic bath of copper to make the thickness of the plated copper layer about 30 microns.

The details of the application of the electroless coating and of the electroplated layer constitute no part of the present invention. In practicing my invention any of the known techniques for the preparation of the surface for the deposition of the electroless coating, for the electroless coating step and for the electroplating step can be used.

The plated moldings thus obtained were tested for peel strength in the following manner. Two rectilinear scratches were cut on the plated surface at a spacing of 10 millimeters. Using an Instron (trademark) tester, the plated layer was pulled along the scratches at an angle of 90° and a speed of 100 millimeters per minute, and the average values of the force required and recorded on the tester were read.

The physical properties were also tested before plating as follows. The notched impact strength was tested at 23° C. with an Izod impact tester on a test bar, whose dimensions were 5 mm. × 5 mm. × 60 mm., with a notch of 1 mm. The tensile strength was measured at 23° C. by means of a Schopper tensile machine using a No. 2 dumbbell. The flow property was tested by a Koka-type flow tester (described in "A Guide to the Testing of Rheological Properties with the Koka Flow Tester" by Arai, published in English in 1958 by the Japanese publishing firm known as Maruzen) under the conditions of a load of 100 kg. per square centimeter and a resin temperature of 190° C. The flow rate of the resin out of a nozzle with a diameter of 1 mm. was recorded in cc./min.

Next, to an emulsion of the graft copolymer was added in various proportions an emulsion of polybutadiene rubber. They were mixed, flocculated, washed and dried by conventional methods to obtain powders. The powders thus obtained were molded and plated by the aforementioned respective methods. The physical properties were also tested according to the aforedescribed procedures.

The test data obtained are set forth in the table which follows.

|  | Graft copolymer, parts by weight | Polybutadiene, parts by weight (post addition) | Physicals before plating | | | After plating, peel strength (g./cm.) |
|---|---|---|---|---|---|---|
|  |  |  | Notched Izod impact (kg. cm.$^2$) | Tensile strength (cc./min.) | Flow (cc./min.) |  |
| Compression moldings | 100 | 0 | 14 | 389 | 2.2 | 2,900 |
|  | 100 | 2 | 14 | 388 | 2.2 | 4,800 |
|  | 100 | 4 | 13 | 382 | 2.4 | 4,600 |
|  | 100 | 6 | 11 | 360 | 3.5 | 2,800 |
| Injection moldings | 100 | 0 | 16 | 368 | 4.2 | 900 |
|  | 100 | 2 | 16 | 367 | 4.1 | 1,700 |
|  | 100 | 4 | 14 | 350 | 4.5 | 1,600 |
|  | 100 | 6 | 12 | 340 | 5.2 | 900 |

As shown in the above table, when the amount of polybutadiene postdaddition exceeds the limit of 5 parts by weight, while the flow of the resin is improved, its impact resistance and tensile strength decrease and, moreover, no improvement is observed in the plate adhesion property.

EXAMPLE 2

An acrylonitrile-butadiene rubber latex (NBR LATEX) was added to and blended in an amount of 2 parts by weight with 100 parts by weight of the graft copolymer of example 1. After flocculation and drying, the powder obtained was processed and plated, and its peel strength was measured in the same manner as in example 1.

| Composition (Parts by Weight) | Peel Strength (g./cm.) Compression Moldings | Injection Moldings |
| --- | --- | --- |
| Graft Copolymer 100 Graft | 2,900 | 900 |
| Copolymer +2 NBR | 5,100 | 1,500 |

EXAMPLE 3

A polybutadiene rubber in powder form was mixed in an amount of 1 part by weight with 100 parts by weight of the graft copolymer in powder form. The mixture was processed and plated, and its peel strength was tested in the same manner as in example 1. It was confirmed that the mixture of the present example was mixed uniformly to a microstate by the fact that a constant torque value was reached in the kneading treatment.

| Composition (Parts by Weight) | Peel Strength (g./cm.) Compression Moldings | Injection Moldings |
| --- | --- | --- |
| Graft Copolymer 100 Graft Copolymer Powder +1 Polybutadiene Powder | 2,900 4,300 | 900 1,400 |

In the case of addition and mixing in the form of powder, as in the case of addition and blending in the form of latex, both the compression and injection moldings have markedly increased peel strength as compared with those of the moldings of the graft copolymer alone.

Having thus described my invention, what I claim and desire to protect by Letters Patent is:

1. The method which comprises intimately and uniformly blending a thermoplastic resinous graft copolymer obtained by graft polymerization of a mixture of monomers comprising at least two kinds of vinyl monomers selected from the group consisting of vinyl aromatics, vinyl cyanides, vinyl pyridines and lower alkyl methacrylates onto a synthetic diene rubber, a separately prepared resinous copolymer of at least two kinds of vinyl monomers selected from the group consisting of vinyl aromatics, vinyl cyanides, vinyl pyridines and lower alkyl methacrylates, and a synthetic diene rubber in an amount ranging from 0.5 to 5.0 parts by weight per 100 parts of said graft copolymer and said resinous copolymer, said last-named rubber being selected from the group consisting of rubbery polybutadiene, butadiene-styrene rubbery copolymer and butadiene-acrylonitrile rubbery copolymer, forming a molded plastic article from the resulting blend, applying an electroless coating of a metal selected from the group consisting of copper and nickel to at least a portion of the surface of the molded plastic article and thereafter electroplating metal on said electroless coating.

2. The method of claim 1 wherein said graft copolymer is an ABS resin and wherein said resinous copolymer is a copolymer of styrene and/or alpha-methyl styrene and acrylonitrile.

3. The method which comprises blending a latex of a thermoplastic resinous graft copolymer obtained by graft polymerization of a mixture of monomers comprising at least two kinds of vinyl monomers selected from the group consisting of vinyl aromatics, vinyl cyanides, vinyl pyridines and lower alkyl methacrylates onto a synthetic diene rubber, a latex of a separately prepared resinous copolymer of at least two kinds of vinyl monomers selected from the group consisting of vinyl aromatics, vinyl cyanides, vinyl pyridines and lower alkyl methacrylates, and a latex of a synthetic diene rubber in such amount that the amount of diene rubber contained in said last-named latex ranges from 0.5 to 5.0 parts by weight per 100 parts of said graft copolymer and said resinous copolymer, said last-named rubber being selected from the group consisting of rubbery polybutadiene, butadiene-styrene rubbery copolymer and butadiene-acrylonitrile rubbery copolymer, coagulating the resulting latex blend, drying the coagulum, forming a molded plastic article from the dried coagulum, applying an electroless coating of a metal selected from the group consisting of copper and nickel to at least a portion of the surface of the molded plastic article, and thereafter electroplating metal on said electroless coating.

4. The method of claim 3 wherein said graft copolymer is an ABS resin and wherein said resinous copolymer is a copolymer of styrene and/or alpha-methyl styrene and acrylonitrile.

5. An article of manufacture comprising a molded plastic body formed from an intimate, uniform blend of a thermoplastic resinous graft copolymer obtained by graft polymerization of a mixture of monomers comprising at least two kinds of vinyl monomers selected from the group consisting of vinyl aromatics, vinyl cyanides, vinyl pyridines and lower alkyl methacrylates onto a synthetic diene rubber, a separately prepared resinous copolymer of at least two kinds of vinyl monomers selected from the group consisting of vinyl aromatics, vinyl cyanides, vinyl pyridines and lower alkyl methacrylates, and a synthetic diene rubber in amount ranging from 0.5 to 5.0 parts by weight per 100 parts of said graft copolymer and said separately prepared resinous copolymer, said last-named rubber being selected from the group consisting of rubbery polybutadiene, butadiene-styrene rubbery copolymer and butadiene-acrylonitrile rubbery copolymer, said body carrying on at least a portion of its surface an electroplated metal layer deposited upon an electroless coating of a metal selected from the group consisting of copper and nickel formed on said portion.

* * * * *